(12) United States Patent  
Born

(10) Patent No.: US 6,469,959 B1
(45) Date of Patent: Oct. 22, 2002

(54) GENERATOR IN PARTICULAR FOR A TIMEPIECE

(75) Inventor: Jean-Jacques Born, Morges (CH)

(73) Assignee: Asulab S.A., Bienne (CH)

( * ) Notice: Subject to any disclaimer, the term of this patent is extended or adjusted under 35 U.S.C. 154(b) by 5 days.

(21) Appl. No.: 09/715,127

(22) Filed: Nov. 20, 2000

(30) Foreign Application Priority Data

Dec. 7, 1999 (EP) .............................................. 99124387

(51) Int. Cl.⁷ ............................. G04B 1/00; H01M 10/46
(52) U.S. Cl. ...................... 368/203; 368/204; 368/160; 368/64; 310/180
(58) Field of Search ........................... 368/64, 160, 203, 368/204; 310/180, 184, 261–266, 156

(56) References Cited

U.S. PATENT DOCUMENTS 4,939,707 A * 7/1990 Nagao ....................... 368/204

5,579,290 A * 11/1996 Zafferri et al. .............. 310/309

FOREIGN PATENT DOCUMENTS

| EP | 751445 | 1/1997 |
| EP | 905 587 | 3/1999 |

* cited by examiner

Primary Examiner—Vit Miska
Assistant Examiner—Jeanne-Marguerite Goodwin
(74) Attorney, Agent, or Firm—Sughrue Mion, PLLC

(57) ABSTRACT

Generator of the clockwork type including a rotor formed of two flanges 8 supporting magnets 9 and arranged at the end of shaft 5 having a diameter D at its centre. The stator is formed of three coils 11a, 11b, 11c carried by a support made in two parts 21 and 22 allowing the coils to be mounted in a separate manner between the rotor flanges upon the assembly of the rotor with the stator. Accordingly, the distance separating two adjacent coils can be less than the diameter D of the rotor shaft after the assembly of the generator. This allows the magnet-coil coupling to be increased by increasing the dimensions of the coils so that the overlapping surface between the flanges 8 which carry the magnets 9 is optimum.

10 Claims, 5 Drawing Sheets

Fig. 1
(PRIOR ART)
Fig. 2
(PRIOR ART)
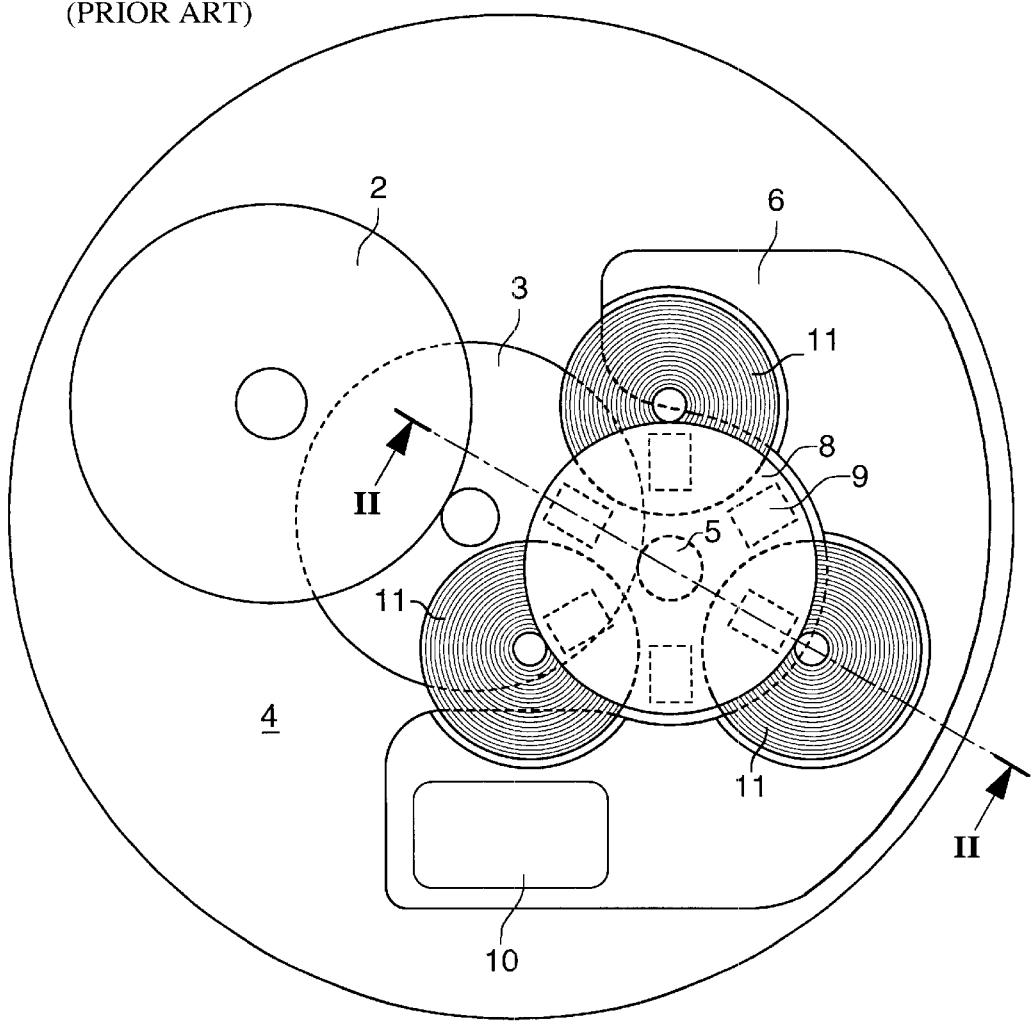
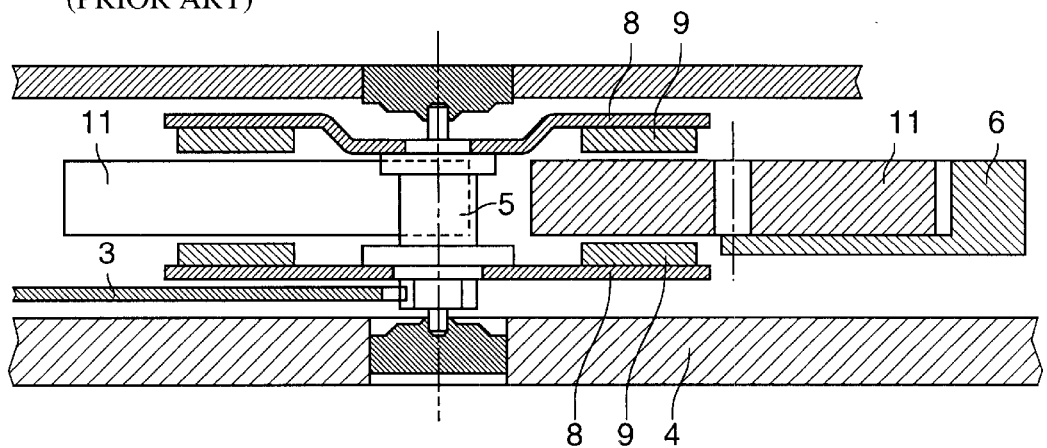

GENERATOR IN PARTICULAR FOR A TIMEPIECE

The present invention relates to a generator of the clockwork type and to a clockwork movement fitted with such a generator, in particular for a wristwatch.

The use of batteries or accumulators is a factor which limits the features of the apparatus, for all applications, and in particular for a watch. Indeed, changing or recharging the batteries or accumulators affects the availability and reliability of the watch.

In this context, the conventional mechanical watch has a certain advantage in watchmaking know-how: such a watch is permanently available. The recharge of power—which is purely mechanical—is achieved simply by rewinding the watch mechanism.

This type of watch uses a manual or automatic winding device generally coupled to a regulating device commonly called a "Swiss lever escapement". It is difficult to obtain a high level of precision with this regulating device. This system is also relatively expensive.

The other large family concerns the conventional quartz watch. A battery simultaneously powers an electric motor and a device for regulating the working of the motor. The motor rotation is controlled by a nominal frequency supplied by a quartz. This provides a high level of precision for the time indication. However, this device is relatively noisy since the forward movement of the second wheel is intermittent and the battery has to be changed periodically.

New types of watch have been made combining the two aforecited systems and exploiting their respective advantages. In these constructions, mechanical power storage has been associated with quartz regulation, supplied with electric power by a generator driven by a mechanical part coupled with a power storage spring.

The article by MM Born, Dinger and Farine "Salto-An automatically wound mechanical movement with the precision of a quartz movement" which appeared in the Swiss Chronometry Society publication "SSC study days 1997", pages 55 to 63 may also be cited as the corresponding state of the art.

The arrangement of the generator according to this prior art is illustrated in FIG. 1 annexed hereto, showing a top view of a partially assembled clockwork movement, and in FIG. 2 annexed hereto, which is a transverse cross-section of FIG. 1. This generator includes a rotor with two flanges 8 arranged on either side of three flat coils 11 forming the stator and offset by 120° with respect to each other relative to the rotor axis, in the same orthogonal plane as the latter.

Six magnets 9 are fixed radially and at regular intervals on each flange 8, facing coils 11. Two consecutive or facing magnets 9 have opposite polarity. A printed circuit 6 is secured to plate 4 and is used as a support for coils 11.

Electric circuit 10, which has a low power consumption, is powered by an electric generator—formed by the shaft assembly of rotor 5, flanges 8, magnets 9 and coils 11—driven via the kinematic connection 3 by barrel device 2. The mechanical power stored in barrel 2 thus drives the rotor. The passage of magnets 9 in proximity to coils 11 generates a substantially sinusoidal induced voltage at the terminals of coils 11.

FIG. 3 annexed hereto demonstrates schematically the fact that the assembly of the monoblock rotor—formed of parts 5, 8 and 9 in the completed device is currently achieved by inserting shaft 5 laterally between two fixed coils 11. The monoblock rotor cannot be inserted vertically since the three coils 11 are fixed and flanges 8 located on either side of these coils must partially cover them. As is clear in particular from FIGS. 2 and 3 of the aforecited document, coils 11 have a space, referenced Dmin in FIG. 3 annexed hereto, at least as wide as rotor shaft 5, having a diameter D at its centre, to allow the shaft to be inserted laterally until it is placed definitively at the centre of the three coils. Because of the space thereby arranged between the three coils 11 offset angularly by 120°, a mediocre covering of coils 11 is obtained from magnets 9, which causes a drop in the yield of the micro-generator, and a relatively large space requirement. In other words, the number of turns of coils 11 superposed onto flanges 8 carrying magnets 9 at their periphery is limited.

The object of the invention is to overcome these drawbacks. The invention therefore concerns a generator of the clockwork type including on the one hand a rotor including two flanges carried by a shaft, this shaft and the flanges being fixed in rotation when operating, magnets, in even numbers, being fixed to each flange—two consecutive or facing magnets having opposite polarity—and including on the other hand a stator formed of at least three coils with axes parallel to that of the rotor, and arranged on a support, these coils being arranged between the two flanges fitted with magnets after the generator is assembled and arranging between them a sufficient central space for said rotor shaft. This generator is characterised in that the coil support is formed of at least two distinct parts which can be assembled with the rotor independently of each other and each carrying at least one coil, and in that means for electrically connecting said at least two parts are provided, the distance separating any two adjacent coils after assembly of the generator being less than diameter D of the rotor shaft.

According to a second embodiment of the invention, the generator of the clockwork type is characterised in that the coil support includes two rigid or rigidified parts, each carrying a coil and a part able to be deformed materially connecting said rigid parts, said deformable part being elastically deformed upon assembly of the rotor to allow the lateral passage of said rotor shaft between two coils, the distance between any two adjacent coils after assembly of the generator being less than diameter D of the rotor shaft.

As a result of the features of the above mentioned first or second embodiment of the invention, it is possible to use the coupling space between the rotor magnets and the stator coils in an optimal manner. The diameter of the rotor shaft is no longer a limiting parameter for the dimensions of the stator coils. Therefore, the yield of the generator and/or the space requirement of the stator are improved.

The invention will be understood from the following description made with reference to the annexed schematic drawings in which.

Figure 3:
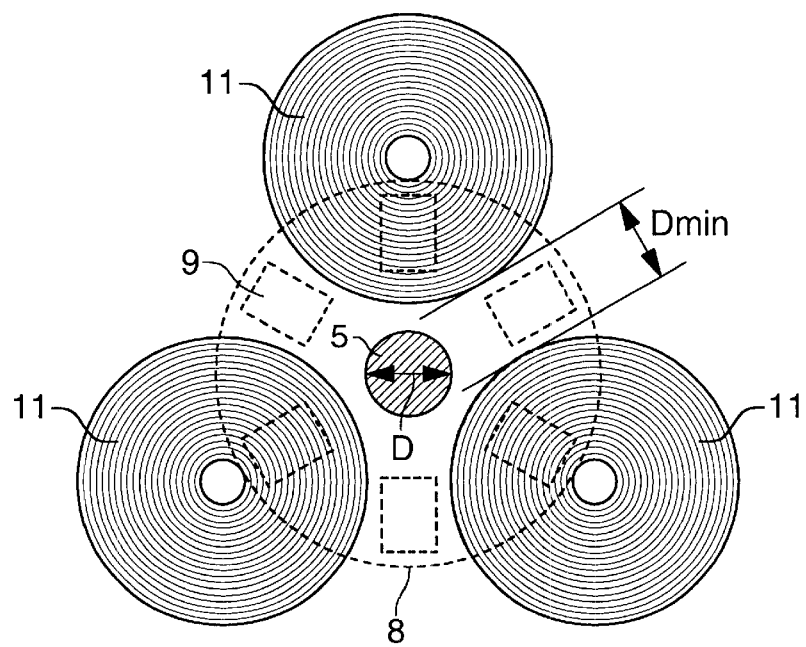
Figure 4:
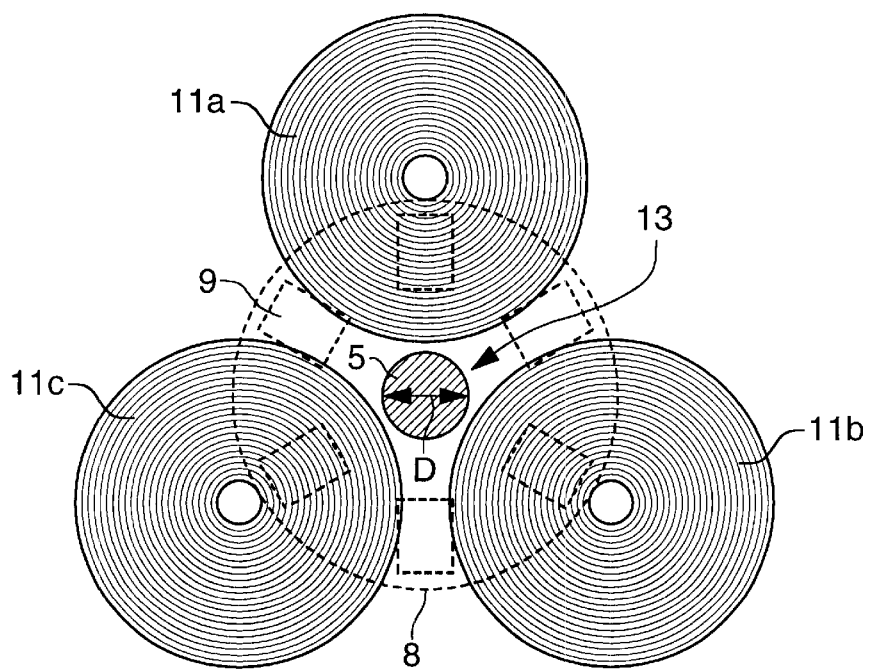
FIG. 4 is cross-section similar to FIG. 3, showing the arrangement of the stator coils and the rotor shaft according to the invention once the generator is mounted.

FIG. 4 shows the arrangement of the rotor whose upper flange 8 and magnets 9 which they carry are represented in dotted lines. Rotor shaft 5 has a diameter D at its centre, which is greater than the distance separating any adjacent two coils. Coils 11a, 11b, 11c define a central space 13 in which rotor shaft 5 is arranged. As can be seen from FIG. 4, the overlapping of coils 11a, 11b, 11c by rotor flanges 8 is greater than in the case of the prior art illustrated by FIG. 3. It will be noted that by increasing the dimensions of flanges 8 and the coils it is possible to obtain a configuration in which the coils touch each other. Thus, the design of the generator according to the invention as will be described more precisely hereinafter allows the magnet-coil coupling of the generator to be increased and/or the space requirement of the stator to be minimized.

Figure 5:
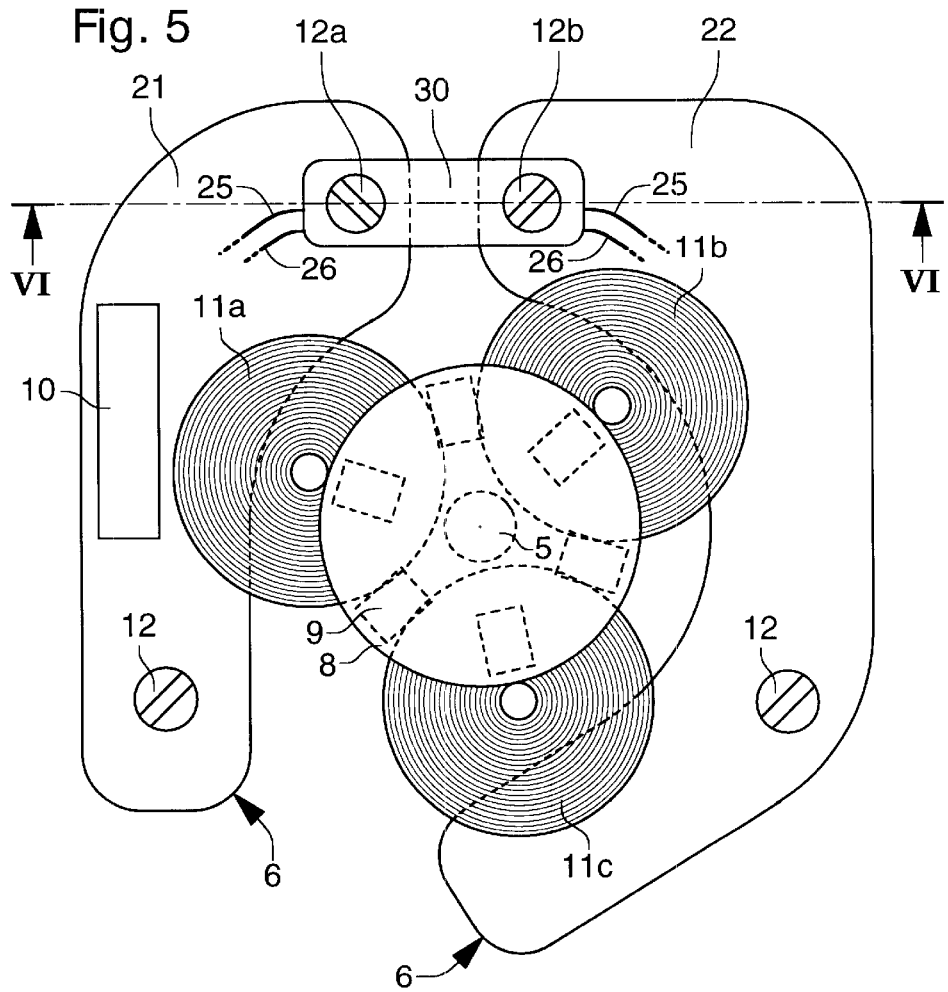
FIG. 5 is a top view and FIG. 6 is cross-section, of a first embodiment including an assembly formed of a substrate made of two parts connected by a bridge.
Figure 6:
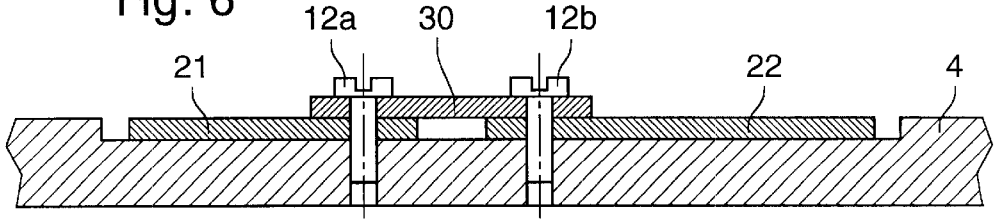
Figure 7:
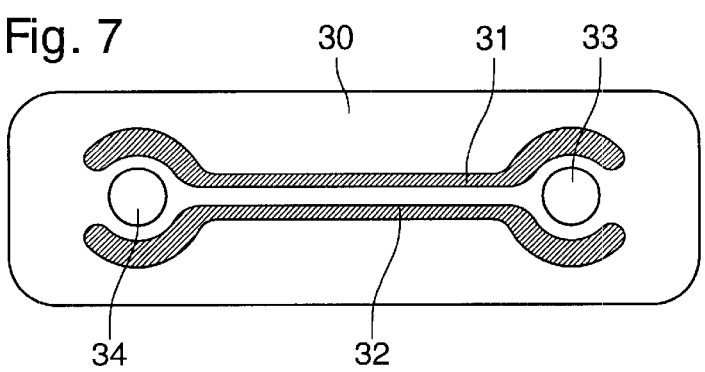
FIG. 7 shows the arrangement of the electrical connection between the two parts of the substrate of the first embodiment.

A first embodiment of the invention will be described hereinafter with reference to FIGS. 5 to 7.

The stator of the generator is formed of a support 6 comprising two distinct plates 21 and 22 and three coils 11a, 11b and 11c. Plate 22 carries coils 11b and 11c. Thus, coil 11a can be introduced between rotor flanges 8 independently of the introduction of coils 11b and 11c. When the rotor is assembled to the stator coils, the latter are not arranged in a position corresponding to that of the assembled generator. As a result, it is no longer necessary to provide a passage between two coils for introducing shaft 5.

Plate 21 is secured to body 4 of the clockwork movement by means of two screws 12 and 12a. Similarly plate 22 is secured to body 4 by means of two screws 12 and 12b. Plates 21 and 22 are connected by a bridge 30 fixed to body 4 by means of screws 12a and 12b. Bridge 30 is used to establish an electrical connection between two electrical strips 25 and 26 partially shown in FIG. 5. Bridge 30 thus has two strips 31 and 32 on its face arranged opposite plates 21 and 22. The ends of strips 31 and 32 have ends in the shape of an arc of a circle around holes 33 and 34 for the passage of screws 12a and 12b. It will be noted that strips 31 and 32 can be arranged differently. These strips need only to allow an electrical connection between strips 25 and 26 provided on the one hand on plate 21 and on the other hand on plate 22, to be established.

Figure 8:
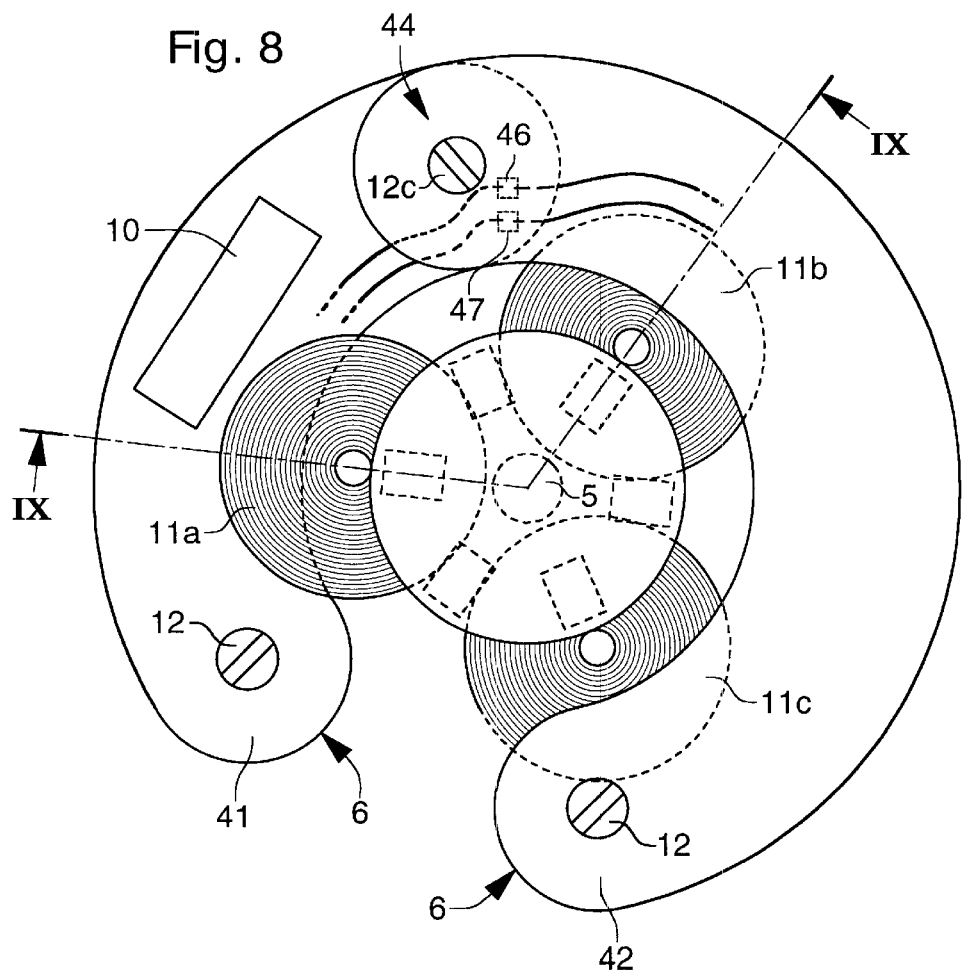
FIG. 8 is a top view and FIG. 9 is cross-section, of a second embodiment of a generator according to the invention.
Figure 9:
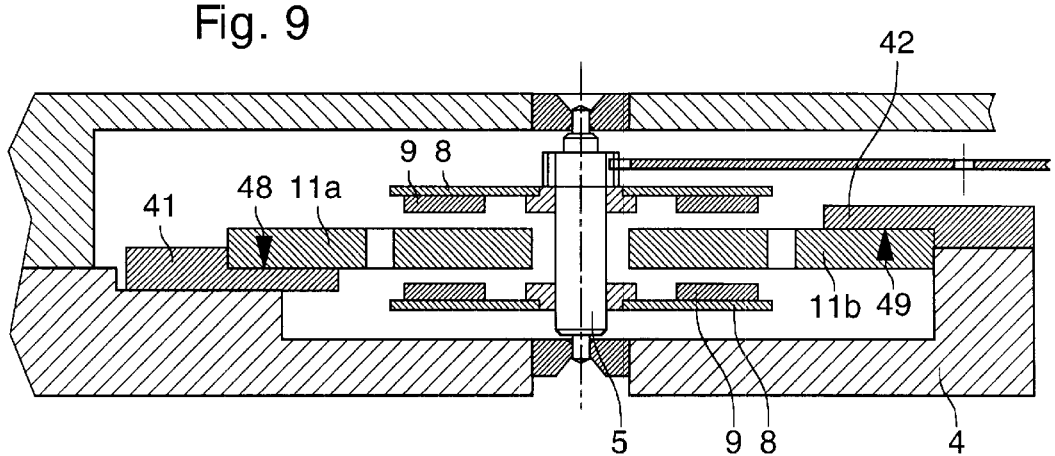

Referring to FIGS. 8 and 9, a second embodiment of the invention will be described hereinafter. Stator 6 distinguishes from that of the preceding embodiment in that it is formed of two plates 41 and 42 partially superposed onto each other after the generator is assembled. Contact areas 46 and 47 are arranged on each of plates 41 and 42 in the superposition region 44 between plates 41 and 42. The two contact areas 46 respectively 47 are arranged opposite each other so as to assure an electrical connection between electrical strips 25 and 26 provided on the one hand on the upper face of plate 41 and on the other hand on the lower face of plate 42.

Lower part 41 carries coil 11a on an upper surface 48 whereas upper part 42 carries coils 11b and 11c on a lower surface 49. Surfaces 48 and 49 are situated at a certain distance from the plane of contact between plate 41 and 42 in superposition region 44. This is to allow the three coils 11a, 11b, and 11c to be arranged in a same general plane between rotor flanges 8.

Again, when the generator is assembled, and in particular when the coils are assembled with their rotor, coil 11a is added separately from coils 11b, and 11c. These coils are thus brought into their definitive relative position when the stator is assembled with the rotor. Once plate 41 and 42 are set in place, the latter are secured to body 4 of the clockwork movement by means of screws 12 and 12c, screw 12c being provided in superposition region 44.

Figure 10:
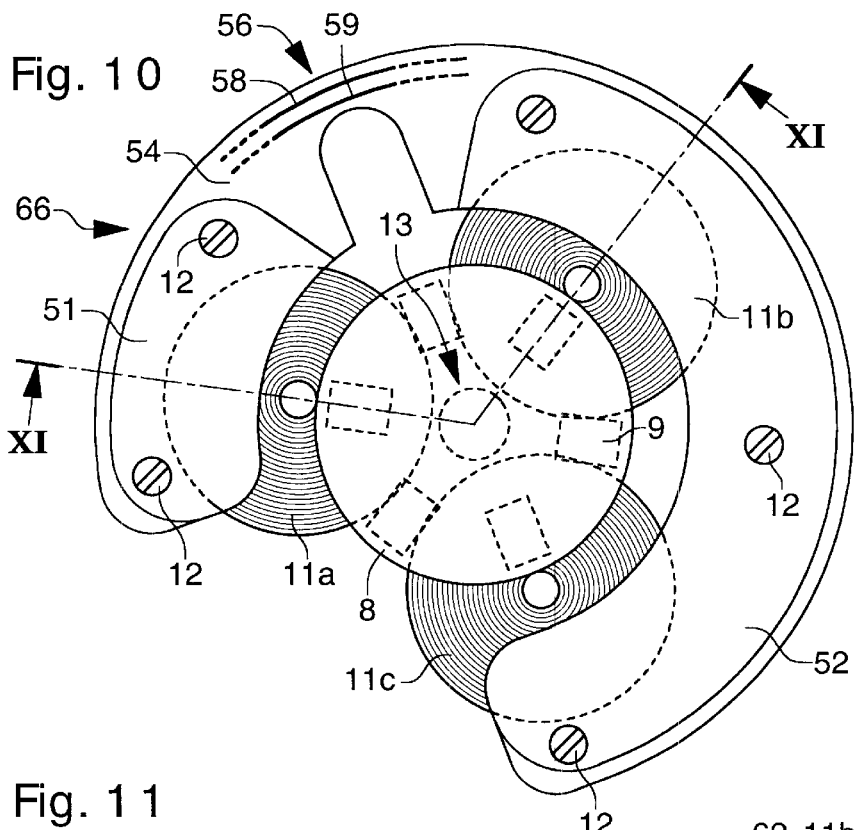
FIG. 10 is a top view and FIG. 11 is cross-section, of a third embodiment of a generator according to the invention.
Figure 11:
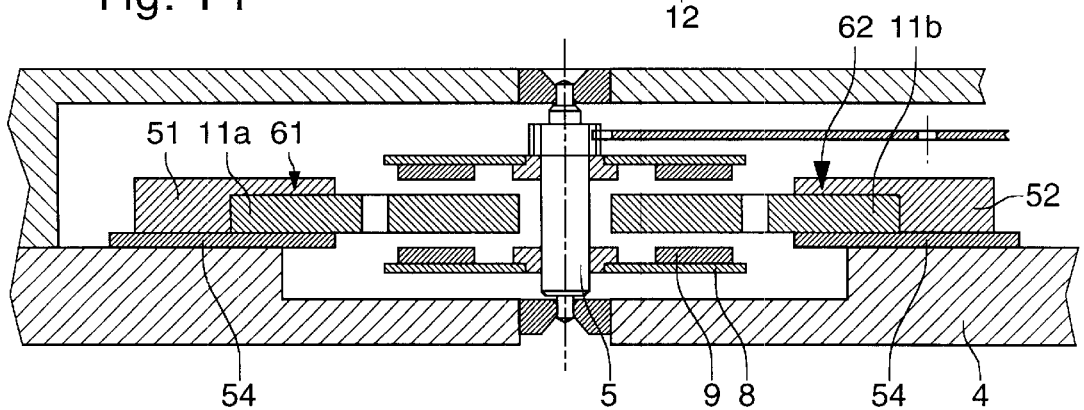

Referring to FIGS. 10 and 11, a third embodiment of the invention will be described hereinafter. In this case, the generator is characterised in that the stator is formed of a support 66 comprising two rigid substrates 51 and 52 and a flexible film 54 having a portion able to be deformed elastically. The flexible film is superposed onto rigid substrates 51 and 52 at least in the region of coils 11a, 11b, and 11c. Substrate 51 carries coil 11a whereas substrate 52 carries coils 11b and 11c. In a variant, flexible film 54 is glued against the lower face of substrates 51 and 52. In another variant, flexible film 54 is only inserted between these substrates and body 4 of clockwork movement, flexible film 54 being thus fixedly held in the two superposition regions of substrates 51 and 52 which are fixed to body 4 by means of screws 12.

The electrical strips connecting the coils are arranged on flexible film 54, two strips 58 and 59 extending across deformable region 56.

Substrates 51 and 52 have respectively parts 61 and 62 superposed onto coils 11a, respectively 11b and 11c. These coils are thus partially inserted in recesses defined between parts 61, 62 and flexible film 54. The coils are secured to substrates 61 and 62 by gluing. A film of adhesive material can also be provided between the coils and flexible film 54 in the superposition regions.

Figure 12:
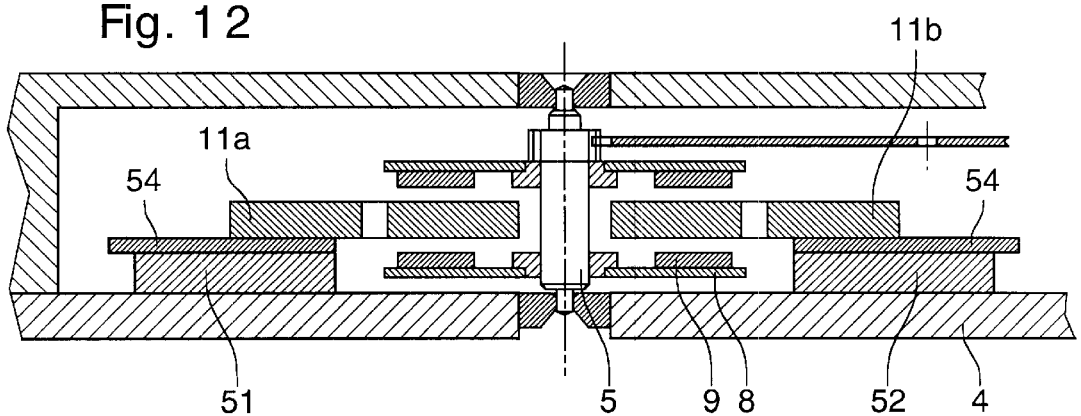
FIG. 12 is a cross-section of a variant of the third embodiment.

In FIG. 12 a cross section of an embodiment variant is shown. This variant differs essentially in that flexible film 54 on which the conductive strips are printed, is situated above rigid substrates 51 and 52. In the region of superposition of the flexible film and the rigid substrates, the flexible film is rigidly assembled to those substrates, in particular by gluing. Coils 11 to 11c are arranged on the flexible film to which they are rigidly secured also by gluing. This variant allows the various components of the generator to be assembled more easily.

Within the scope of the third embodiment, the mounting of the stator and the rotor is effected by moving coils 11a and 11c apart and elastically deforming portion 56 of flexible film 54 to allow rotor shaft 5 to be introduced in the central region 13 defined by the three coils. This last embodiment has the advantage of providing a previously assembled monobloc stator prior to the assembly of the rotor with the stator. Deformable portion 56 is formed so as to undergo the slight deformation necessary to allow the passage of shaft 5 without it damaging conductive strips 58 and 59 extending across region 56.

What is claimed is:

1. A generator of the clockwork type, comprising:
    a rotor, including two flanges, carried by a shaft disposed between said flanges and having a shaft diameter D and a shaft axis, said rotor having magnets fixed to each flange, and two consecutive ones of said magnets, arranged on a same flange, having opposite polarity;
    a stator formed of at least three coils having axes parallel to said shaft axis and being fixed onto a support, said coils being arranged between said flanges and defining between said coils a central space for the rotor shaft, wherein said support is formed of at least two distinct parts which can be assembled with the rotor independently of each other, each part carrying at least one of said coils, the distance separating any two adjacent coils, after assembly of the generator, being less than said diameter D of the rotor shaft; and
    means for electrically connecting said at least two parts.

2. The generator according to claim 1, wherein said electrical connecting means comprises a bridge connecting said two parts of said support, said bridge being provided on a face thereof with conductive strips situated opposite said two parts.

3. The generator according to claim 1, wherein said two parts of said support, in a region thereof, are partially superposed onto each other after assembly of the generator, said two parts including, in the superposed region, at least first and second contact areas electrically connected to each other.

4. The generator according to claim 3, wherein one part of said two parts, which is situated at a lower level with respect to the other of said two parts, carries its at least one coil on an upper surface, whereas said other part carries its at least one coil on a lower surface so that all of said coils carried by said support are situated in a same general plane after assembly.

5. A clockwork movement fitted with the generator according to claim 1.

6. A generator of the clockwork type, comprising:

a rotor, including two flanges, carried by a shaft disposed between said flanges and having a shaft diameter D and a shaft axis, said rotor having magnets fixed to each flange, and two consecutive ones of said magnets, arranged on a same flange, having opposite polarity; and a stator formed of at least three coils having axes parallel to said shaft axis and being fixed onto a support, said coils being arranged between said flanges and defining between said coils a central space for the rotor shaft, wherein the support comprises:

at least two rigid parts, each carrying at least one of said coils; and a deformable part materially connecting said rigid parts, said deformable part being elastically deformed upon assembly of the rotor to allow lateral passage of said rotor shaft between two of said coils, any two adjacent ones of said coils, after assembly of the generator, being less than said diameter D of the rotor shaft.

7. The generator according to claim 6, wherein said support is formed of a flexible film on which conductive strips are deposited and of at least two rigid substrates at least partially superposed onto said flexible film, said flexible film defining said deformable part, and said at least two rigid substrates defining respectively said at least two rigid parts.

8. The generator according to claim 7, wherein said two rigid substrates are secured to a body in which said rotor is mounted, said flexible film being arranged between said aid two rigid substrates.

9. The generator according to claim 8, wherein said two rigid substrates include parts superposed onto the coils and arranged on a side opposite to the flexible film with respect to the coils.

10. The generator according to claim 7, wherein said flexible film is glued onto said rigid substrates, said coils being rigidly secured to said flexible film.

* * * * *